United States Patent
Vasudevan et al.

(10) Patent No.: US 12,395,409 B2
(45) Date of Patent: Aug. 19, 2025

(54) DIMENSIONING OF TELECOMMUNICATION INFRASTRUCTURE

(71) Applicant: Telefonaktiebolaget LM Ericsson (publ), Stockholm (SE)

(72) Inventors: Shrihari Vasudevan, Chennai Tamil Nadu (IN); M. J. Prasath, Chennai (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/566,508

(22) PCT Filed: Nov. 17, 2021

(86) PCT No.: PCT/EP2021/081941
§ 371 (c)(1),
(2) Date: Dec. 1, 2023

(87) PCT Pub. No.: WO2022/253454
PCT Pub. Date: Dec. 8, 2022

(65) Prior Publication Data
US 2024/0267300 A1 Aug. 8, 2024

(30) Foreign Application Priority Data
Jun. 4, 2021 (IN) .............................. 202141024872

(51) Int. Cl.
*H04L 41/147* (2022.01)
*H04L 41/16* (2022.01)

(52) U.S. Cl.
CPC ............ *H04L 41/147* (2013.01); *H04L 41/16* (2013.01)

(58) Field of Classification Search
CPC ....... H04L 41/147; H04L 41/16; H04W 16/22
See application file for complete search history.

(56) References Cited

U.S. PATENT DOCUMENTS

2020/0145337 A1* 5/2020 Keating .............. H04L 47/2425
2021/0201209 A1* 7/2021 Sghiouer ................ G06N 20/00

FOREIGN PATENT DOCUMENTS

WO WO-2020095232 A1 * 5/2020 ......... H04L 41/0806

OTHER PUBLICATIONS

Declaration of Non-Establishment of International Search Report and Written Opinion with Transmittal dated Mar. 24, 2022 in PCT/EP2021/081941 (9 pages).
(Continued)

*Primary Examiner* — Philip C Lee
(74) *Attorney, Agent, or Firm* — Weisberg I.P. Law, P.A.

(57) ABSTRACT

The application relates to method for determining resource needs needed in a telecommunications network for providing a network function in the telecommunications network, comprising the steps of—determining training data describing network traffic, determining domain specific features of the telecommunications network to be used as predictors of a regression model in which the predictors are weighted by model weights to determine the resource needs, wherein the training data are described by the regression model, the regression model being configured to predict the resource needs, determining domain knowledge of the telecommunications network on at least one of expected values of the model weights, expected boundaries of the model weights and constraints between the model weights, encoding the domain knowledge as at least one of a prior probability distribution, constraints between model weights and boundaries of the model weights, encoding target values of the resource needs as a likelihood probability distribution centered on outcomes of the regression model, determining the model weights of the regression model through Bayesian modeling, taking into account the likelihood probability distribution, the prior probability distribution, optionally at (Continued)

least one of the constraints between the model weights and boundaries of the model weights, and determining the resource needs based on the determined regression model.

20 Claims, 5 Drawing Sheets

(56) References Cited

OTHER PUBLICATIONS

Schneider, S. et al., "Machine Learning for Dynamic Resource Allocation in Network Function Virtualization", IEEE Conference on Network Softwarization (NetSoft 2020) (9 pages).
Gong, Z. et al., "PRESS: PRedictive Elastic ReSource Scaling for cloud systems", Proc. 6th IEEE/IFIP International Conference on Network and Service Management (CNSM 2010), Oct. 2010, Niagara Falls, Canada (8 pages).
Cloudscale, Method—CloudScale Project, Dec. 3, 2021, https://www.cloudscale-project.eu/results/method/ (3 pages).
Imdoukh, M. et al., "Machine learning-based auto-scaling for containerized applications", SpringerLink, Oct. 8, 2019, https://link.springer.com/article/10.1007/s00521-019-04507-z (3 pages).

\* cited by examiner

DIMENSIONING OF TELECOMMUNICATION INFRASTRUCTURE

CROSS REFERENCE TO RELATED APPLICATIONS

This application is a 35 U.S.C. § 371 National Stage of International Patent Application No. PCT/EP2021/081941, filed 2021 Nov. 17, which claims priority to Indian Patent Application No, 202141024872, filed 2021 Jun. 4.

TECHNICAL FIELD

The present application relates to a computer-implemented method for determining resource needs, needed in a telecommunications network for providing a network function, also called dimensioning. Furthermore, the corresponding entity is provided configured to determine the resource needs. In addition, a computer program comprising program code is provided in a carrier comprising the computer program.

BACKGROUND

Dimensioning of a telecommunication cloud infrastructure (VNF (Virtual Network Function)/CPU/Memory) or as a non-cloud implemented hardware structure is critical for pre-sales support (contract formulation), field deployment and also as an ongoing activity to cater to the increase in subscriber growth and introduction of new services, with the technology evolution. Introduction of NFV (Network Function Virtualization) enabled the expansion of network capacity in a shorter period of time. Operators deployed their VNFs in the NFV architecture predominantly using the on-premises telecommunication cloud infrastructure. The NFV architecture enabled the operator to scale down and scale up faster than the traditional PNF (physical network Function) networks, where the hardware has to be procured, commissioned and connected in order to be made available for Network Application deployment.

Although the NFV improved the expansion and scalability of Telecommunications Networks better than the traditional PNF networks, the underlying infrastructure usage is not optimized. Various efforts are taken in the industry to understand the dimensioning requirement based on the historical data from PM (performance measurement) counters, by monitoring the network behavior and other factors.

AI/ML (Artificial Intelligence/machine learning) approaches to data driven Telco Cloud Dimensioning are still in nascent stages. The current approaches/solutions utilize off-the-shelf ML models to fit the data, resulting in non-intuitive models. This results in lack of trust and a perception of model being a black-box. The model thus produced will purely rely on the data set that is made available for the model without incorporating any understanding of the domain and relationships between the weights. Accordingly a need exists to further improve the dimensioning of a telecommunication infrastructure such as a network function.

SUMMARY

According to a first aspect a computer implemented method for determining resource needs required for a telecommunications network for providing a network function is provided, wherein the method comprises the step of determining training data describing a network traffic. Furthermore domain specific features of a telecommunications network to be used as predictors of regression model are determined, in which the predictors are weighted by model weights to determine the resource needs, wherein the training data is described by the regression model and the regression model is configured to predict the resource needs. Furthermore, domain knowledge of the telecommunications network is determined for at least one of expected values of the model weights, constraints between model weights and expected boundaries of the model weights. The domain knowledge is encoded as at least one of a prior probability distribution, constraints between model weights and the expected boundaries of the model weights. Furthermore, target values of the resource needs are encoded as a likelihood probability distribution centered on outcomes of the regression model. The model weights of the regression model are then determined through Bayesian modeling taking into account the prior probability distribution, the likelihood probability distribution and optionally at least one of the constraints between the model weights and boundaries of the model weights. The resource needs are determined based on the determined regression model.

Furthermore, the corresponding entity is provided configured to determine the resource needs as discussed above or as discussed in further detail below. The entity can be implemented as comprising a memory and at least one processing unit wherein the memory contains instructions executable by the at least one processing unit wherein the entity is configured to operate as mentioned above or as discussed in further detail below.

As an alternative the entity configured to determine the resource needs comprises a first module configured to determine training data describing the network traffic. The entity comprises a second module configured to determine domain specific features of the telecommunications network to be used as predictors of the regression model in which the predictors are weighted by model weights to determine the resource needs and wherein the training data are described by the regression model and the regression model is configured to predict the resource needs. A third module of the entity is configured to determine domain knowledge of the telecommunications network on at least one of expected values of the model weights, constraints between model weights, expected boundaries of the model weights. A fourth module of the entity is configured to encode the domain knowledge as at least one of a prior probability distribution, constraints between model weights and the expected boundaries of the model weights. A fifth module is configured to encode target values of the resource needs as a likelihood probability distribution centered on outcomes of the regression model. A sixth module may be configured to determine the model weights of the regression model through Bayesian modeling, taking into account the likelihood probability distribution and the prior probability distribution and optionally at least one of the constraints between the model weights and the boundaries of the model weights. A seventh module of the entity is configured to determine the resource needs based on the determined regression model.

Additionally a computer program comprising program code is provided, wherein execution of the program code causes the at least one processing unit to execute a method as discussed above or as explained above or in more detail below A carrier comprising the computer program is provided, wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

The invention proposes a system for Dimensioning Telecommunications NFs that is based on AI/ML and that can incorporate domain-knowledge. The inventive method proposes an AI/ML modeling approach that can fit the data-sample provided but also incorporate SME (Subject Matter Expert) intuitions and Telecommunications domain-knowledge in the model being learnt. The technical objective of the inventive method is to bias the modeling process with domain-knowledge to produce Telecommunications-personalized models (e.g. with intuitive coefficients) that are at-least as competitive as the best models obtainable without domain-knowledge incorporation, for the same data.

Dimensioning involves learning a regression model e.g. a linear regression model; this invention uses the Bayesian modeling paradigm to suggest a Bayesian regression model in a manner that allows an SME to specify approximate model weights, an expected spread and/or acceptable bounds around those weights and/or any constraints (e.g. equalities and inequalities) between the weights. Given this specification, any off-the-shelf optimization approach may be employed to find the weights of the Dimensioning model.

While the invention is discussed around the Telecommunication dimensioning application and around Linear Regression models; the inventive method is generic—it can be applied across Telecommunications use-cases and for different kinds of models subject to certain assumptions. The assumptions made and the alternate solutions (embodiments) when those assumptions are violated are mentioned in the detailed invention formulation.

Figure 1:
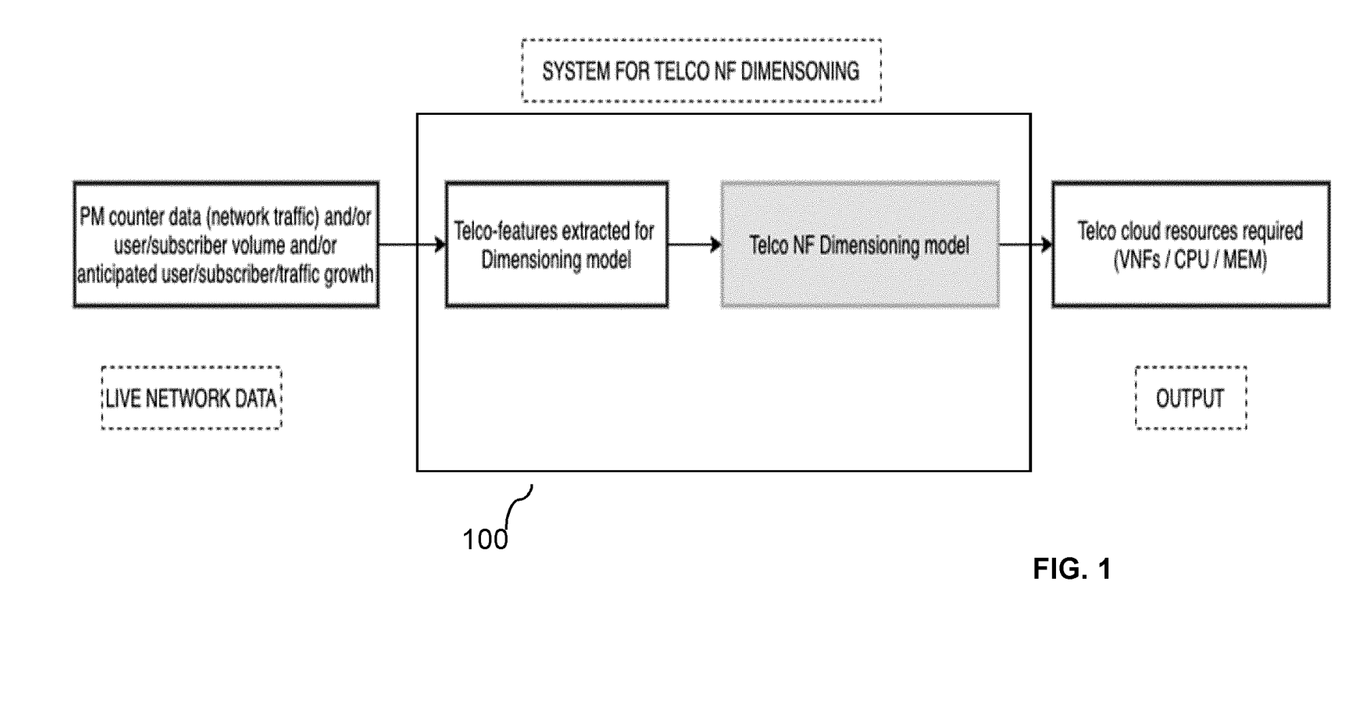
FIG. 1 shows a schematic view of a way to dimension a network function of the communications network.

FIG. 1 schematically shows the system for dimensioning a network function for a telecommunications network comprising entity 100 configured to generate as an output the resource needs for a network function in the telecommunications network, wherein the output can include a number of units of virtual network functions, VNFs, configured to provide the network function, a processor load or utilization of memory needed to provide network function. The entity 100 receives network traffic data obtained by a counter or several counters configured to determine performance measurements. The input for entity 100 can furthermore include a user/subscriber traffic of a user or subscriber of the telecommunications network. As an alternative or in addition anticipated traffic growth may be provided.

Accordingly dimensioning model is used for the regression model having a set of weights that need to be estimated. Here a linear regression model was used, wherein a Bayesian Linear Regression model was used to achieve the desired objective.

Figure 2:
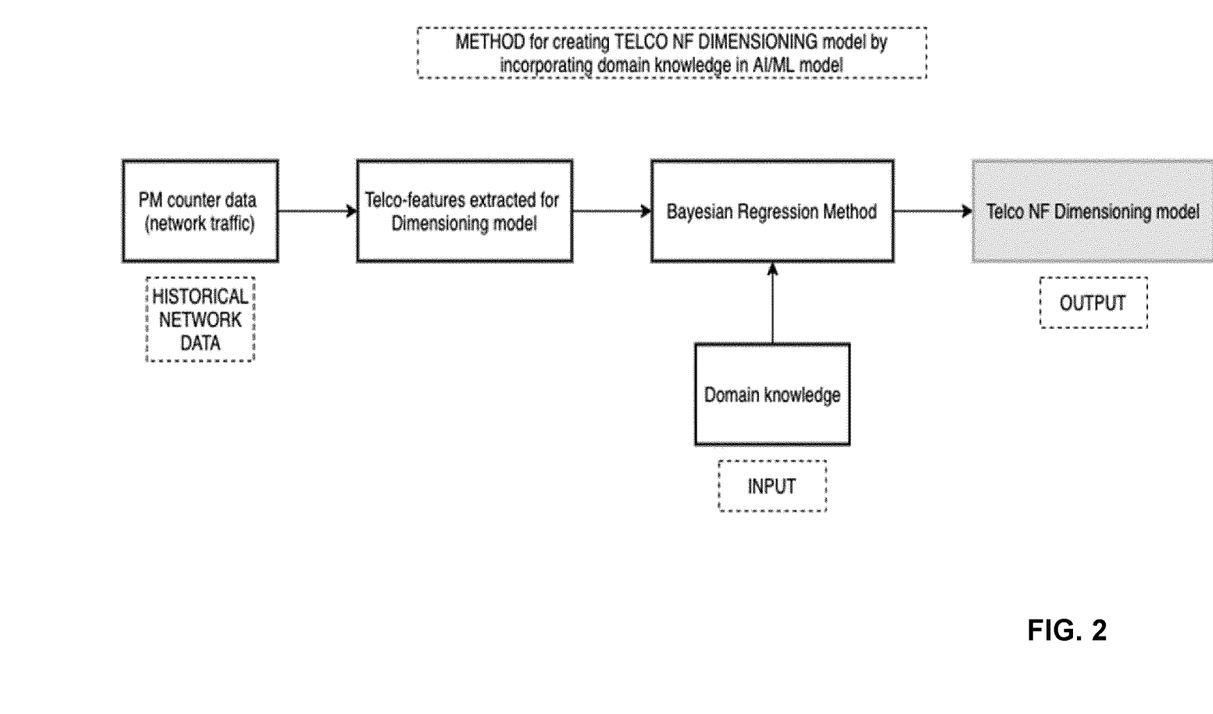
FIG. 2 shows a schematic view of a way to create a dimensioning model for the network function using historical network data and domain knowledge.

FIG. 1 showed the use and the testing of entity 100 when the Bayesian regression finally provided the final dimensioning model with determined features or feature values (predictors) and the determined model weights for the features, whereas FIG. 2 shows the method for creating the dimensioning model by incorporating domain knowledge and training data. Here the entity 100 receives the network traffic as counted by performance measurement counters of historical network data of the telecommunications network. Furthermore, domain knowledge is input in the determination of a Bayesian regression model so that the output of entity 100 is the dimensioning model that can be used to determine the network resources as shown in FIG. 1. The Telecommunications network may be a mobile telecommunications network.

The system shown in FIGS. 1 and 2 may ingest PM counter data capturing network traffic volumes and/or user/subscriber volumes and/or anticipated growth in users/subscribers/traffic. The first of these may be encoded into engineered features of the Dimensioning model; it is also possible to feed PM counter data directly into a Neural Network (NN) model (if a non-feature-engineering approach is desired) that may create the features automatically. The latter two may be translated into equivalent changes in the model features through SME inputs or prior domain-knowledge or separate AI/ML models for them. It is conceivable to ingest these inputs directly into a NN model. The outcome of this stage in FIG. 1 includes feature-values that are fed into the Dimensioning model. In FIG. 2, these feature values are fed into a regression model, whose weights are learnt. The resulting trained regression model is the dimensioning model or system which is applied in FIG. 1.

The Dimensioning model is an AI/ML based regression model. In the case of a dimensioning of a network function in a telecommunications network, this may be a linear regression model given a set of features as the predictors. The outcome of the Dimensioning model could be the number of units of a virtual network function (VNF) or may be the expected utilization of CPU or memory.

The method of creating the Dimensioning model is captured in brief in the FIG. 3, and is explained in further detail below. The Bayesian Regression box of FIG. 2 is meant to encompass the steps of FIG. 3. Essentially, data encoding network traffic is subject to data-exploration to identify the appropriate AI/ML regression model that would fit the data. For example, this could be a linear regression model. Data encoding network traffic could be PM counter data in their raw form or processed as engineered features, motivated by the domain. The historical network data used as training data can include resource needs for every datum.

Figure 3:
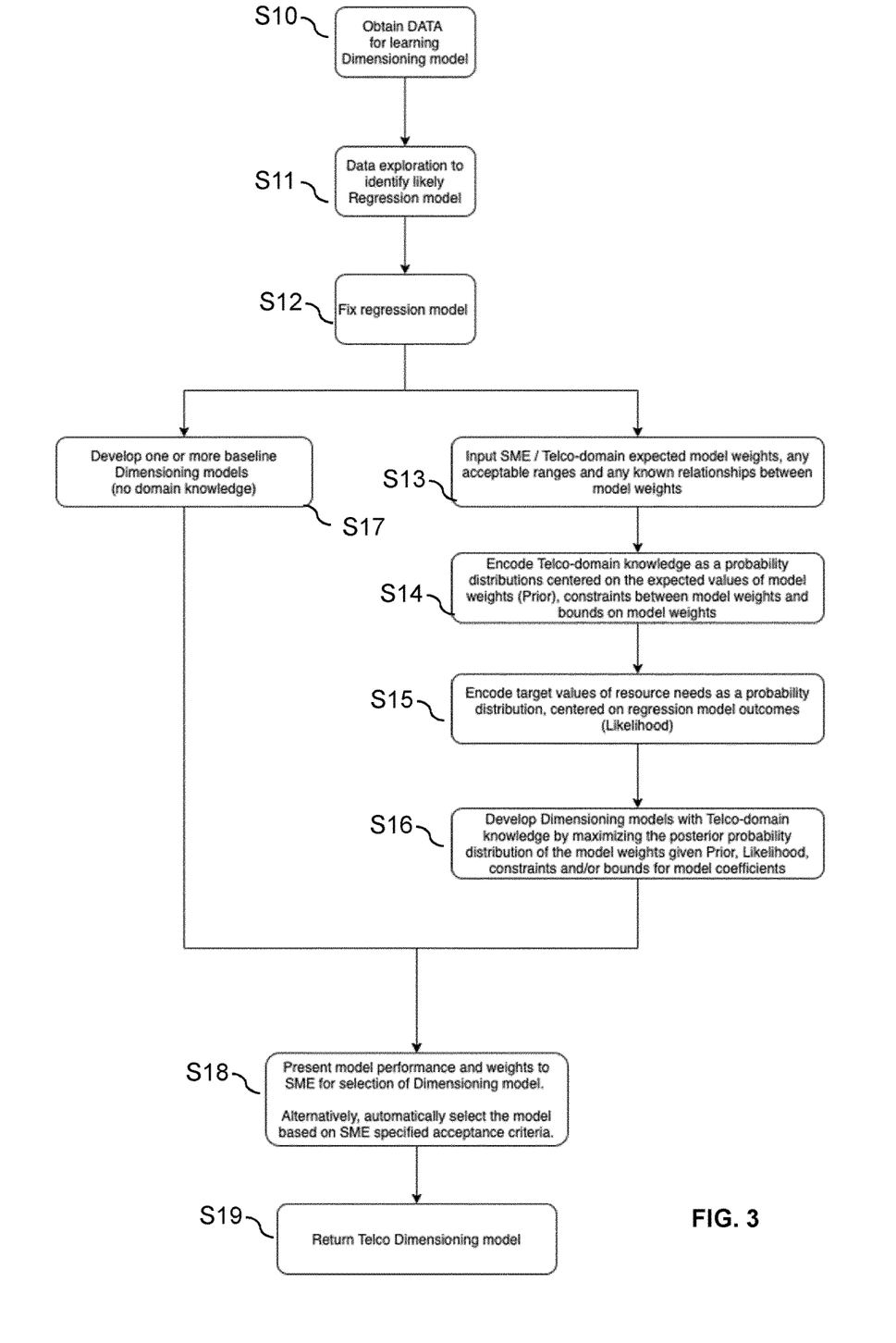
FIG. 3 shows a schematic view of a flowchart comprising the steps to determine the resource needs for a network function.

FIG. 3 shows a more detailed view of the method to determine the regression model with its corresponding features and model weights. The dimensioning model corresponds to the regression model having a set of model weights that need to be estimated.

Once the regression model is identified, baseline regression models can be created without any domain-knowledge injection. For linear regression, this could be an Ordinary Least Squares model. In parallel, SME/domain-knowledge inputs are incorporated via a Bayesian Regression approach for the chosen regression model. Both the baseline model and the Bayesian equivalent that incorporates domain knowledge are evaluated (e.g. via Cross Validation). Their coefficients and performance metrics are used to pick the final Dimensioning model for the system.

Further details on the mechanisms for domain-knowledge incorporation, mathematical detail of the approach and several use-cases covering different scenarios are described further below. In particular, reference is made to a table covering several example application use-cases that follows the mathematical derivation.

In step S10 data are obtained for learning the dimensioning model wherein the data can include the historical network data. In step S11 data exploration is carried out to identify a likely regression model. In step S12 a regression model is fixed, by way of example a linear regression model as will be explained in further detail below. In step S13 an expert in the field of Telecommunications networks can input the expected model weights, any acceptable ranges of the model weights such as expected boundaries of the model weights including ranges and bounds of the model weights. Furthermore, any known interrelationships between the model weights may be input. In step S14 the domain knowledge is encoded as probability distributions centered on the expected values, (model weights) (prior), constraints and bounds on the model weights. In step S15 target values of resource needs are encoded as a probability distribution, centered on regression model outcomes, called likelihood probability distribution hereinafter. In step S16 the dimensioning models with the knowledge is developed by maximizing the posterior probability distribution of the model weights given the prior, likelihood, an optionally constraints and/or bounds for the model weights, if available.

The same time in step S17 one or more baseline dimensioning models may be developed without using any domain knowledge. In step S18 the model performance and the model weights are presented to an expert in the field for selection of the dimensioning model or the model may be automatically selected based on predefined acceptance criteria. In step S19 the dimensioning model is then returned for use in the determination of the resource needs.

The expert may pick the baseline model if the data doesn't conform to the domain knowledge and the resulting performance is poor compared to the baseline model. However, as long as the domain knowledge driven models perform competitively relative to the baseline model they provide a more intuitive and trustable alternative. The competitiveness may also be determined by the pre-defined threshold. Any domain knowledge based model which is not worse in performance than the baseline model by more than a threshold may be considered as being competitive.

The expert or USER may input into the device
- an expected list of model weights and/or potential spread and/or
- a list of bounds of the model weights and/or
- one or more equality/inequality constraints on model weights
- we can also have default values for inputs the SME fails to provide (e.g. the expected model weights or spread); there may be different ways of ingesting such information into the system.

The following walk-through explains the invention and method in operation as a sequence of steps wherein reference is also made to the steps of FIG. 3 mentioned above. A specific application case of Dimensioning for IMS (IP Multimedia Subsystem), network function CSCF (Call Session Control Function) is used to demonstrate the invention. The features and model may differ in other Telecommunications Dimensioning application contexts.

As shown in step S10, historical network data of PM counters that capture network traffic behavior is obtained. This is used to learn the Dimensioning model, which may then be applied on live-network or test data of the same or possibly different clients. This data is processed into Telco domain-specific features. For example, in CSCF, the PM counters may be abstracted into the following features a. Call_Attempts: Number of call (or session) attempts received by the NF b. Answered_Calls: Number of call (or session) that were answered by B-party.

c. Call_Duration: The total call duration of all the established calls.

d. Initial_Registrations: Number of initial registration attempts received by the NF e. Re_Registrations: Number of re-registration attempts received by the NF f. De_Registrations: Number of de-registration attempts received by the NF g. Total_SMS: Number of SMS service attempts received by the NF h. CPU_Load: The target quantity (CPU resources required) that needs to be predicted by the Dimensioning model.

This data (features or predictors a to g extracted above) is used for developing a Telecommunications Dimensioning model to predict the target resource needs (quantity h).

The data is subject to various exploratory data analysis steps to understand any trends that might influence the selection of the Dimensioning Regression model. As an example, a scatter plot of the features may be considered. From the plot, it may become clear that CPU_Load is linearly related to each of the features in consideration. Therefore, a Linear Regression model may be chosen as the Dimensioning model. The scatterplot may also reveal more complex (e.g. polynomial or other) relationships between the target and the features, influencing the Regression model chosen. Accordingly, the regression model is now identified and fixed as mentioned in steps S11 and S12.

Furthermore available domain knowledge is determined and any known relationships and it should be understood that the domain knowledge may change with Network Function, application context or as per the choice of the user of the invention)
a) Call_Attempts and Answered_Calls are typically the most important features explaining network traffic volume/behavior.
b) Known constraints between coefficients
Call_Attempts>=Answered_Calls>=90% Call Attempts
Initial_Registrations and De_Registrations have a dual/equal relevance in explaining network traffic volume/behavior.

c) [Optional]—approximate weights for each feature/predictor in the model
d) [Optional]—approximate lower/upper bounds for the weights of each feature/predictor in the model.

This corresponds to step S13 of FIG. 3. Steps S14 and S15 are explained in further detail in the detailed description of the mathematical description following in further detail below. In S14 the available domain knowledge is encoded through a suitable probability distribution (called prior probability distribution), constraints between model weights and/or bounds for the model weights. In S15 the target values for the resource needs are encoded as likelihood probability distribution, centered on the regression model outcomes.

A modeling process to produce a dimensioning model of a communications environment is discussed in connection with the table shown below.

| # | Model | De_ Registrations | Initial_ Registrations | Re_ Registrations | Call_ Duration | Call Attempts | Answered_ Calls | Total_ SMS | Intercept_ or_SD | Train_ RMSE |
|---|---|---|---|---|---|---|---|---|---|---|
| 1 | OLS + X-Normalization | 0.0003 | 0.0001 | −0.0001 | 0.0000 | 0.0007 | −0.0003 | 0.0122 | 43.9745 | 0.8911 |
| 2 | OLS + Scaling | 0.1372 | 0.0563 | −0.0122 | 0.0408 | 1.3389 | −0.5422 | 0.0005 | 0.4510 | 0.8911 |
| 3 | Ridge (1e−4) + Scaling | 0.1462 | 0.0461 | −0.0111 | 0.0402 | 1.3025 | −0.5052 | 0.0006 | 0.4426 | 0.8917 |
| 4 | Ridge (5e−3) + Scaling | 0.2532 | −0.0770 | 0.0037 | 0.0321 | 0.7413 | 0.0643 | 0.0027 | 0.3250 | 1.0430 |
| 5 | Ridge (1e−1) + Scaling | 0.1307 | 0.0352 | 0.0174 | 0.0394 | 0.4332 | 0.3591 | 0.0069 | 0.2224 | 1.3853 |
| 6 | Bayesian Linear Regression (BLR) + Scaling | 0.0918 | 0.0500 | 0.0456 | 0.0406 | 0.4065 | 0.3808 | 0.0070 | 0.5477 | 1.5102 |
| 7 | BLR + Learn SD + Unconstrained + Scaling | 0.2803 | −0.1415 | 0.0444 | 0.0355 | 0.9101 | −0.1099 | −0.0000 | 0.0110 | 1.0755 |
| 8 | BLR + Learn SD + Bounded + Scaling | 0.0878 | 0.0532 | 0.0460 | 0.0335 | 0.4039 | 0.3898 | 0.0069 | 0.0147 | 1.5122 |
| 9 | BLR + Learn SD + Bounds + C(IR = DR) + Scaling | 0.0701 | 0.0701 | 0.0459 | 0.0366 | 0.5932 | 0.2000 | 0.0056 | 0.0142 | 1.3896 |
| 10 | As-above + C(IR >= DR, CA >= AC) | 0.0701 | 0.0701 | 0.0459 | 0.0366 | 0.5932 | 0.2000 | 0.0056 | 0.0142 | 1.3896 |
| 11 | As-above + C(IR >= DR, CA >= AC >= 0.9CA) | 0.0699 | 0.0699 | 0.0461 | 0.0351 | 0.4180 | 0.3762 | 0.0069 | 0.0156 | 1.5218 |
| 12 | wu-0 + learn-su + C(>= 1e−4, IR >= DR, CA >= AC) + Scaling | 0.0704 | 0.0704 | 0.0457 | 0.0394 | 0.7907 | 0.0001 | 0.0042 | 0.0129 | 1.2623 |
| 13 | wu-0 + learn-su + C(>= 1e−4, IR >= DR, CA >= AC >= 0.9CA) + Scaling | 0.0700 | 0.0700 | 0.0461 | 0.0355 | 0.4178 | 0.3760 | 0.0069 | 0.0156 | 1.5219 |

-continued

| # | Model | De_Registrations | Initial_Registrations | Re_Registrations | Call_Duration | Call Attempts | Answered_Calls | Total_SMS | Intercept_or_SD | Train_RMSE |
|---|---|---|---|---|---|---|---|---|---|---|
| 14 | wu-0 + learn-su + bounds + C(IR >= DR, CA >= AC) + Scaling | 0.0701 | 0.0701 | 0.0459 | 0.0370 | 0.5928 | 0.2000 | 0.0056 | 0.0143 | 1.3896 |
| 15 | wu-0 + learn-su + bounds + C(IR >= DR, CA >= AC >= 0.9CA) + Scaling | 0.0700 | 0.0700 | 0.0461 | 0.0355 | 0.4178 | 0.3760 | 0.0069 | 0.0156 | 1.5219 |

Notes
- Intercept for a linear regression refers to the constant offset of that model
- In the column "Intercept_or_SD", for non-Bayesian approaches tested, this column records the intercept; for Bayesian approaches, the standard deviation of the Likelihood probability distribution (sd) is captured. This may be manually specified using prior knowledge or a reasonably assumed (e.g. case 6) or may be learnt from data—cases where "Learn SD" is mentioned do this (e.g. cases 7-15).
  - Note that in the tests above, the Bayesian models implicitly assume that when predictors are all zero, the CPU load prediction is zero i.e. zero constant offset in prediction. If this is unreasonable, we just need to add another weight to capture the "intercept or constant offset" also.
  - Likewise, the anticipated spread of the model weights around their expected values (denoted by wu) is captured by a standard deviation parameter (su); "su" may be reasonably assumed or learnt from data as demonstrated in cases 12-15.
- The last column captures a performance measure Train_RMSE which is the root mean squared error of the predictions computed over the training data. The idea has since been applied to multiple network function data-sets to verify its efficacy.
- Baselines are captured in cases 1 and 2 where the data is subject to normalization in case 1 and scaling in case 2. All subsequent cases used scaled data. The idea was also successfully tested with data-standardization. In both cases, while the performance metric is identical, the coefficients are counter-intuitive to the Telecommunications domain.
- For a given data-set, no unbiased linear model (incorporating prior knowledge is a bias) is going to outperform the OLS, captured in cases 1 and 2. The key is the trade-off between an acceptable level of error while getting the ability to have intuitive coefficients with respect to the Telecommunications domain—this is what is achieved here.
- Cases 3-5 show some additional baseline models that were used; Ridge regression is penalized (penalty on model weights) Linear Regression; the penalty factor was set manually.
- Cases 6-15 are all embodiments of the invention, demonstrating different application examples (with different assumptions) captured in the table provided with the methodology. They are briefly described below for convenience. For the current context Bayesian Ridge Regression and Bayesian Linear Regression are synonymous; also, model coefficients and model weights are synonymous.
  6. Bayesian Linear Regression with both sd and su assumed; expected weights provided; bounds for weights provided but no constraints between weights given
  7. Bayesian Linear Regression with su assumed; sd learnt from data; expected weights provided; bounds and constraints not provided
  8. Bayesian Linear Regression with su assumed; sd learnt from data; expected weights and bounds provided; constraints not provided
  9. Bayesian Linear Regression with su assumed; sd learnt from data; expected weights and bounds provided; constraint provided—Initial_Registrations=De-Registrations
  10. Bayesian Linear Regression with su assumed; sd learnt from data; expected weights and bounds provided; constraints provided—(1) Initial_Registrations>=De-Registrations and (2) Call_Attempts>=Answered_Calls
  11. Bayesian Linear Regression with su assumed; sd learnt from data; expected weights and bounds provided; constraints provided—(1) Initial_Registrations>=De-Registrations and (2) Call_Attempts>=Answered_Calls>=90% Call_Attempts
  12. Bayesian Linear Regression; expected weights not provided by domain expert; both sd and su learnt from data; no bounds provided; constraints provided—(1) All positive coefficients, (2) Initial_Registrations>=De-Registrations and (3) Call_Attempts>=Answered_Calls
  13. Bayesian Linear Regression; expected weights not provided by domain expert; both sd and su learnt from data; no bounds provided; constraints provided—(1) All positive coefficients, (2) Initial_Registrations>=De-Registrations and (3) Call_Attempts>=Answered_Calls>=90% Call_Attempts
  14. Bayesian Linear Regression; expected weights not provided by domain expert; both sd and su learnt from data; bounds provided; constraints provided—(1) All positive coefficients, (2) Initial_Registrations>=De-Registrations and (3) Call_Attempts>=Answered_Calls 15. Bayesian Linear Regression; expected weights not provided by domain expert; both sd and su learnt from data; bounds provided; constraints provided— (1) All positive coefficients, (2) Initial_Registrations>=De-Registrations and (3) Call_Attempts>=Answered_Calls>=90% Call_Attempts Note that
- cases 9-11 demonstrate Bayesian Linear Regression with a domain expert providing expected weights, bounds for the weights and constraints between weights
- cases 12-13 demonstrate Bayesian Linear Regression with a domain expert only providing constraints between weights
- cases 14-15 demonstrate Bayesian Linear Regression with a domain expert only providing bounds for the weights and constraints between weights
- In this case, an increase in RMSE of approx. 0.5 given the prediction range is over 300 MHz (CPU load) is deemed negligible; instead, Telecommunications intuitive coefficients or weights of the (Bayesian) Linear Regression model are obtained.

Baseline Regression models are developed, given data and no-domain knowledge. In this case, Ordinary Least Squares (OLS) provides a gold-standard baseline linear regression model. This is shown in row 2 in the above table annotated as "Baseline"
- The performance of the baseline model is evaluated.
- Typically, the coefficients are non-intuitive (e.g. negative coefficients or the number of SMS has a higher weight than the number of answered calls) even if performance is good.

Bayesian Linear Regression with available domain knowledge is performed to obtain alternate Telco-personalized Dimensioning models.
  i. Assume that only domain-knowledge a. and b mentioned above in step S10, i.e. the call-Attempts and the known constraints is available for this example and that it is known that coefficients are positive.
  ii. As shown in examples-of-application case 7 of the table following the math-detail below, Equation (3) (see below) is optimized using any off-the-shelf optimizer that can accept constraints. The result is a set of coefficients that define a Telecommunications-personalized Dimensioning model.
  iii. This case is shown in the $3^{rd}$ row from the bottom of the table shown above (case 13). Typically, for a similar performance, desirable coefficients are obtained. The table also captures several other application use-cases, considering availability/un-availability of approximate coefficients, bounds or constraints.
  iv. This domain-specific Dimensioning model is also evaluated for performance.

The coefficients and performance of the baseline and Telco-personalized Dimensioning models are compared to pick a Dimensioning model that is returned.
  v. If the Telco-personalized Dimensioning models provide competitive performance compared to the baseline, it is chosen; else, the baseline is returned.
  vi. In this case, an increase in RMSE of approx. 0.5 given a prediction range of approximately 50 to 350 MHz pf CPU load is negligible and therefore, the domain-specific model is chosen.

LIVE NETWORK DATA or test data from a potential/prospective client is obtained.

The client wishes to Dimension for a service that they want to deploy and provides a small sample of data.

This data is converted to the Telecommunications domain-specific features or predictors used by the Dimensioning model.

The Telco-personalized Dimensioning model learnt above is applied to the new test data.

The prediction obtained is returned to the client as Dimensioning estimate. It may also be translated to an estimated number of CSCF VNF instances based on a desired utilization per VNF instance and then returned to the client.

The test data may be obtained from possibly a new client or from the same client who may want to perform dimensioning again to cater to current network traffic behavior or deploy a new service.

As mentioned above, the Regression model for Telco-NF Dimensioning and the features extracted from the data may change with VNF. For instance, if we had to dimension the Serving-GW in the EPC network, one might use the S11 counters to achieve it. The features that could be considered in this case are
- EPS Bearer Creation: No of Create Session Request messages received by SGW
- EPS Bearer Deletion: No of Delete Session Request messages received by SGW
- EPS Bearer Modification: No of Modify Bearer Request messages received by SGW Without loss of generality, the invention formulation is developed using a multiple linear regression model. We note below that the model can be any regression model, whose weights or coefficients (used interchangeably in the math derivation below) need to be estimated, subject to two assumptions listed below.

It should be noted that in the event these assumptions are violated the approach still holds; only, instead of optimizing a closed form equation specified below, the approach will need to use alternative and possibly more time-consuming inference techniques.

Assumptions
- Model predictions are related to observed data by additive Gaussian white noise,
- Coefficients may be reasonably assumed to be Gaussian distributed, centered on the values domain-knowledge may provide.
- For ease of notation, coefficients are assumed to be independent of each-other, with identical spread around their respective expected values.

General Gaussian distribution for k-dimensional random variable x given k dimensional mean µ and k×k dimensional covariance matrix Σ is given by $$N(x; \mu, \Sigma) = (2\pi)^{(-k/2)} |\Sigma|^{(-1/2)} \exp\left\{-\frac{1}{2}(x-\mu)^T \Sigma^{-1}(x-\mu)\right\}$$

If x and µ are k-dimensional and the variance is denoted by $\sigma^2$, we get $$N(x; \mu, \sigma^2) = (2\pi\sigma^2)^{(-1/2)} \exp\left\{-\frac{(x-\mu)^2}{2\sigma^2}\right\}$$

If x and µ are k-dimensional, but we can assume that the individual dimensions are independent of each other with identical variance $\sigma^2$, $$N(x; \mu, \sigma^2) = \prod_{i=1}^{k}(2\pi\sigma^2)^{(-1/2)}\exp\left\{-\frac{(x_i - \mu_i)^2}{2\sigma^2}\right\} =$$

$$(2\pi\sigma^2)^{(-k/2)}\exp\left\{-\frac{\|(x-\mu)\|_2^2}{2\sigma^2}\right\}$$

where $\|x\|_2^2$ represents the squared L2-norm. Note that setting $\Sigma = \sigma^2 I_k$ in the first equation above will produce the same result.

Consider $$P(w|x, y) = \frac{P(y|w, x) \cdot P(w)}{p(y|x)}$$

where x, y and w are (n×d) predictor, (n×1) target and (d×1) weight matrices respectively. We want to find d weights w given n data (x,y) where each x is a d-dimensional input of d predictor values and y represents the quantity to be explained/estimated in terms of the predictors.

Subject to the aforementioned assumptions, for a single datum $x_i$, $y_i$, $$P(y_i|x_i, w) \sim N(x_i w, \sigma_d^2) = (2\pi\sigma_d^2)^{(-1/2)}\exp\left\{-\frac{(y_i - x_i w)^2}{2\sigma_d^2}\right\}$$

Reasonably assuming that the n data are independent and identically distributed (IMID) samples of the same distribution, $$P(y|x, w) \sim N(xw, \sigma_d^2) = \prod_1^n (2\pi\sigma_d^2)^{(-1/2)}\exp\left\{-\frac{(y_i - x_i w)^2}{2\sigma_d^2}\right\} \quad (1)$$

this gives $$P(y|x, w) \sim N(xw, \sigma_d^2) = (2\pi\sigma_d^2)^{(-n/2)}\exp\left\{\frac{-\|y - xw\|_2^2}{2\sigma_d^2}\right\}$$

The mean is simply a linear model (Regression; matrix multiplication), the variance, representing the noise in the data, can be reasonably assumed by data-exploration analysis or may also be learnt from the data, along with the weights i.e. we can also learn the set $(w, \sigma_d)$ from the data.

Maximum-likelihood-estimation of the weights in this case maximizes the log-likelihood obtained from Equation (1) i.e., it minimizes the negative log-likelihood given by $$\frac{n}{2}\log(2\pi\sigma_d^2) + \frac{\|y - xw\|_2^2}{2\sigma_d^2} \quad (2)$$

Note: n/2 log(2π) is constant relative to the parameters to be optimized and can be removed.

Incorporating SME/Domain Knowledge

Consider that an expert is able to specify that approximate desirable weights $w_{user}$ (k-dimensional vector) that can be reasonably encoded by a Gaussian distribution with a possible spread quantified by $\sigma_{user}^2$.

$$P(w) \sim N(w_{user}, \sigma_{user}^2) = (2\pi\sigma_{user}^2)^{(-k/2)}\exp\left\{-\frac{\|w - w_{user}\|_2^2}{2\sigma_{user}^2}\right\}$$

The mean and variance can reflect user expectations. The variance can be assumed to be a small number (e.g. 0.01) if the user is confident of the expected value or even much larger (e.g. 1) to reflect the user's uncertainty of the actual weights compared to the knowledge they are incorporating. Basically, it captures an anticipated measure of spread in the weights being incorporated. This can also be learnt from data along with other model weights. As above, the negative log-likelihood of the prior distribution of the weights P(w) is expressed as $$\frac{k}{2}\log(2\pi\sigma_{user}^2) + \frac{\|w - w_{user}\|_2^2}{2\sigma_{user}^2}$$

Now, consider the posterior distribution of the weights P(w|x,y) given likelihood P(y|w,x) and prior P(w).

$$P(w|x, y) = \frac{P(y|w, x) \cdot P(w)}{\int_w P(y|w, x) \cdot P(w) dw}$$

Maximizing the posterior requires finding weights w that $$\Rightarrow \text{maximize } P(y|w, x) \cdot P(w)$$
$$\Rightarrow \text{maximize } \log P(y|w, x) + \log P(w)$$
$$\Rightarrow \text{minimize } -\log P(y|w, x) - \log P(w)$$
$$\Rightarrow \text{finding weights } w \text{ that minimize}$$

$$\frac{n}{2}\log(2\pi\sigma_d^2) + \frac{k}{2}\log(2\pi\sigma_{user}^2) + \frac{\|y - xw\|_2^2}{2\sigma_d^2} + \frac{\|w - w_{user}\|^2}{2\sigma_{user}^2} \quad (3)$$

where n is the number of data. Being a constant, 2π can be removed and the first two terms can be simplified. ⇒ use any appropriate off-the-shelf optimizer to find the weights.

The expert may additionally specify bounds and/or constraints (e.g. two weights need to be equal) to further restrict the search space of desirable coefficients/weights. Given the SME's prior knowledge of the weights to begin with, the approach will find optimal weights given the data. The approach will allow for a model that the expert can trust. A linear model y=x w is not mandatory—any model can be used subject the above assumptions; just replace x w with that model (e.g. neural-network (w,x) or some such) in the cost function above. The approach will learn an L2-regularized model; in the case of a linear model, this would be equivalent to Bayesian Ridge Regression.

This is a simplified approach. The methodological Bayesian way of doing this would be to draw samples from the posterior weight distribution, make inferences with these weights and take an aggregate (and standard deviation) of these inferences. The simple approach is basically using the mode/mean (weights) of the posterior weight distribution to get a point estimate for predictions. A measure of uncertainty (standard deviation) for any such point estimate would be the RMSE computed on the data used to learn the model.

When the aforementioned Gaussian distribution assumptions do not hold (e.g. for a classification problem) the approach to domain-knowledge injection still holds but instead of optimizing Equation (3), the approach would require the inference to be performed using alternative mechanisms like Markov-Chain Monte-Carlo methods, Variational Inference and other approximation methods to estimate posterior distribution of the weights.

By examples below, methods of domain knowledge injection is shown in modeling. Without loss of generality, a linear regression model y=a.x1+b.x2+c.3 is considered where the data-set (n rows, 4 columns—x1, x2, x3 and y) provided will include predictors or dependent variables x=(x1,x2,x3) and associated predictions or independent or target variables y. The task is to learn coefficients w=(a,b,c) of a linear model y=xw=a.x1+b.x2+c.x3

| Case | Requirements (SME/domain knowledge) | SME inputs | Method |
|---|---|---|---|
| 1 | Best unbiased model only | None | Return Ordinary Least Squares Regression model using any off-the-shelf tool. The resulting coefficients may not be intuitive. This can also be done by optimizing Equation (2) but it is treated as a baseline. |
| 2 | Positive coefficients only | A list of constraints for w = (a, b, c) as a ≥ 0, b ≥ 0 and c ≥ 0 | Per approach, perform a constrained optimization of Equation (2), with $\sigma_d^2$ set to 0.5, over the constrained search-space of weights w to return the weights minimizing the cost function. |
| 3 | Known approximate coefficients | Approximate coefficients $w_{user}$ and possibly (can be assumed to a default value otherwise) an approximate measure of spread $\sigma_{user}$ such that the exact coefficients will typically be within $3\sigma_{user}$ of $w_{user}$. Note that $\sigma_d$ = approximate noise in the data can also be provided by SME based on knowledge of the data OR it reasonably assumed given the data-exploration step OR it can be learnt along-side model-weights | Per the approach presented above, optimize Equation (3) and return the model weights that minimize the cost function. |
| 4 | Known approximate coefficients and bounds on acceptable values | Case 3 inputs + bounds for W = (A, B, C) as (A1, A2), (B1, B2), (C1, C2) | Per approach, optimize Equation (3) with bounds applied to the search-space of weights and return the model weights that minimize the cost function. Note that the bound can also be incorporated via $\sigma_{user}$. In this case, bounded optimization may not be required. |
| 5 | Known approximate coefficients, bounds on acceptable values and constraints on coefficients | Case 4 inputs + a list of constraints (equalities/inequalities) between coefficients e.g. a == b and b >= c | Per approach, optimize Equation (3) with bounds and constraints applied to the search-space of weights and return the model weights that minimize the cost function. |
| 6 | Known approximate coefficients and constraints on coefficients | Case 3 inputs + a list of constraints (equalities/inequalities) between coefficients e.g. a == b and b >= c | Per approach, optimize Equation (3) with constraints applied to the search-space of weights and return the model weights that minimize the cost function. |
| 7 | UNKNOWN approximate coefficients and spread; UNKNOWN (upper) bounds of positive coefficients; KNOWN constraints on coefficients; potential multi-collinearity in data | Only list of constraints (equalities/inequalities) between coefficients e.g. a, b, c >= 0, a == b and b >= c. In this case, $w_{user}$ can be set to zero and $\sigma_{user}$ and $\sigma_d$ can both be learnt along with other weights. | Per approach, optimize Equation (3) with constraints applied to the search-space of weights and return the model weights that minimize the cost function. |
| 8 | UNKNOWN approximate coefficients and spread; | Bounds for W = (A, B, C) as (A1, A2), (B1, B2), (C1, C2) and a | Per approach, optimize Equation (3) with bounds |

| Case | Requirements (SME/domain knowledge) | SME inputs | Method |
|---|---|---|---|
| | KNOWN (upper) bounds of positive coefficients; KNOWN constraints on coefficients; potential multi-collinearity in data | list of constraints (equalities/inequalities) between coefficients e.g. a == b and b >= c. In this case, $w_{user}$ can be set to zero and $\sigma_{user}$ and $\sigma_a$ can both be learnt along with other weights. | and constraints applied to the search-space of weights and return the model weights that minimize the cost function. |

Other cases involving presence/absence of approximate coefficients, bounds and constraints can also be treated as shown above.

Context-Adaptive Domain-Knowledge Injection

Consider $$P(w|x, y, \theta) = \frac{P(y|w, x) \cdot P(w; \theta)}{p(y|x)}$$

where x, y and w are matrices/vectors of appropriate dimensions and θ denotes the DETERMINISTIC CONTEXT.

Finding model weights w given n data (x,y) is desired where x represents the multiple predictors and y represents the quantity to be explained/estimated in terms of the predictors.

In this case, it is assumed that there is some clear RULE or CLASSIFIER that identifies θ.

Depending on the context θ (e.g. the state of an indicator/counter/ . . . ), different priors could be applied (domain knowledge about coefficients, bounds and constraints), using a look-up table of domain knowledge, to ESTIMATE different model coefficients $w_\theta$.

Depending on the context θ, one could APPLY different models (with coefficients $w_\theta$ to the incoming data, thereby realizing a "look-up table" of model coefficients.

The rule or classifier will incorporate suitable similarity metrics to identify if θ has been observed before=>look-up and use contextual domain-knowledge or models learnt or is entirely new=>either a default domain-knowledge can be used or a SME can define a new context and associated domain-knowledge to be used.

In this case, the formulation and implementation will be exactly identical to above, with the addition of θ and associated look-up of domain-knowledge and learnt model.

If θ denotes a STOCHASTIC CONTEXT i.e. if the state of an indicator/counter/some-other cannot be uniquely determined and is probabilistically associated with multiple state-values, the formulation can incorporate a probability distribution for θ as shown.

Consider $$P(w|x, y, \theta) = \frac{P(y|w, x) \cdot P(w|\theta) \cdot P(\theta)}{p(y|x)}$$

Most likely, the Categorical distribution for P(θ) may be of interest.

Model-estimation will here most likely (definitely, if above point is true), need sampling based approaches or approximation methods to estimating coefficients. This will take longer than above.

Model-inference here will give predictions that essentially aggregate predictions for different $w_\theta$ and θ values.

The probabilities of θ being one/none of the previously observed contexts is captured in the distribution.

Accordingly, the respective domain-knowledge associated with these contexts will influence the final model and/or prediction.

Again, if θ has not been observed before (low probabilities for observed θ), a SME can specify a new context with associated domain knowledge or a default setting can be used.

For e.g. if θ is 70% $\theta_1$ and 30% $\theta_2$ as per the classifier in use. Each of $\theta_1$ and $\theta_2$ have associated domain knowledge constraints. The resulting model coefficients will be 70% influenced by the domain knowledge of $\theta_1$ and 30%, by that of $\theta_2$. The same applies to the model predictions also.

Figure 4:
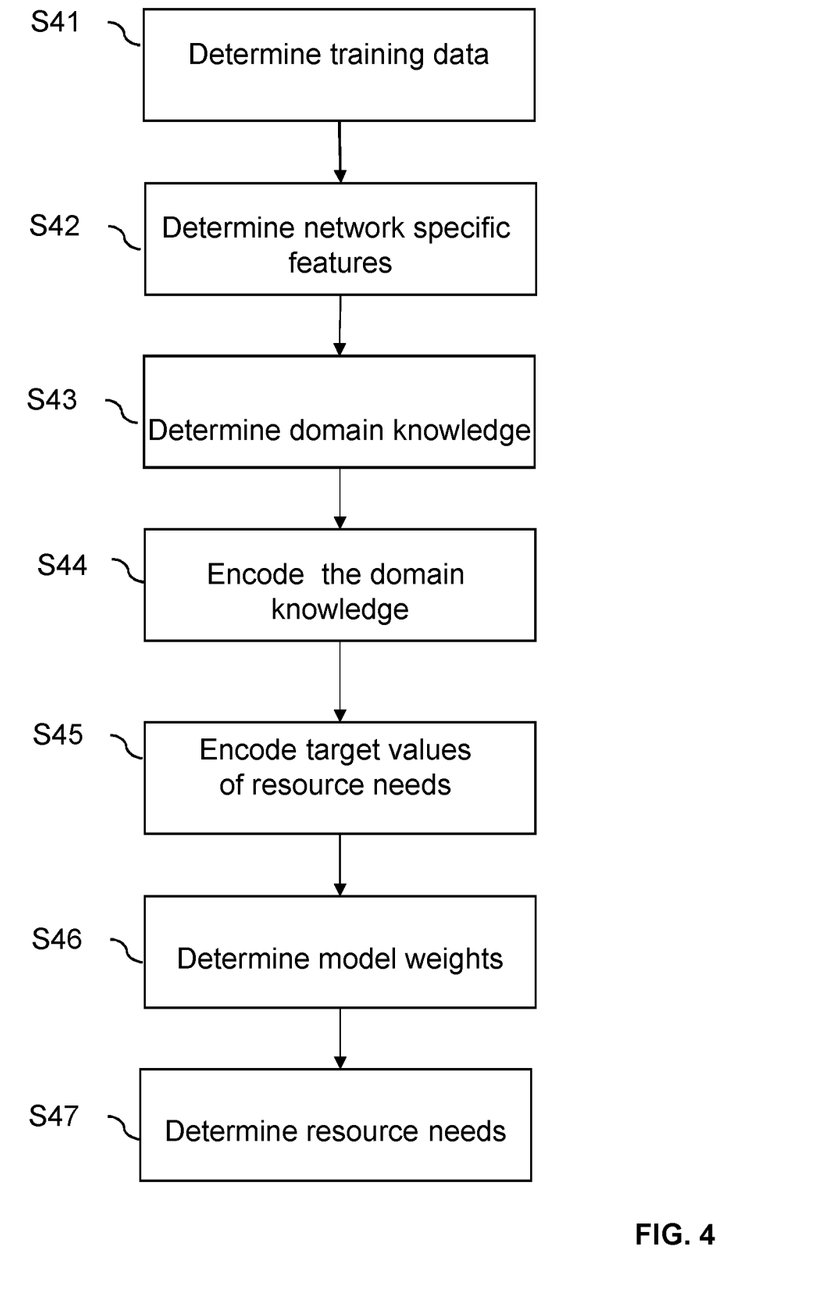
FIG. 4 shows another schematic view of a flowchart comprising the steps carried out by the entity to determine the resource needs.

FIG. 4 summarizes some of the main steps in the method discussed above. In step S41 training data is determined describing the network traffic. Furthermore, in step S42 domain specific features of the telecommunications network are determined which are used as predictors or features of a regression model. In step S43 domain knowledge of the telecommunications network is determined such as expected values of the model weights, expected ranges of the model weights and inter-relationships between the model weights (i.e. constraints). The domain knowledge is then encoded as prior probability distribution, constraints or expected boundaries. Furthermore, target values of the resource needs are encoded as outcome of the regression model as the likelihood probability distribution, centered around the regression model outcomes. After these encoding steps S44 and S45 the model weights are determined through the Bayesian modeling. Finally in step S47 the resource needs are determined based on the determined regression model also known as the Dimensioning model.

Figure 5:
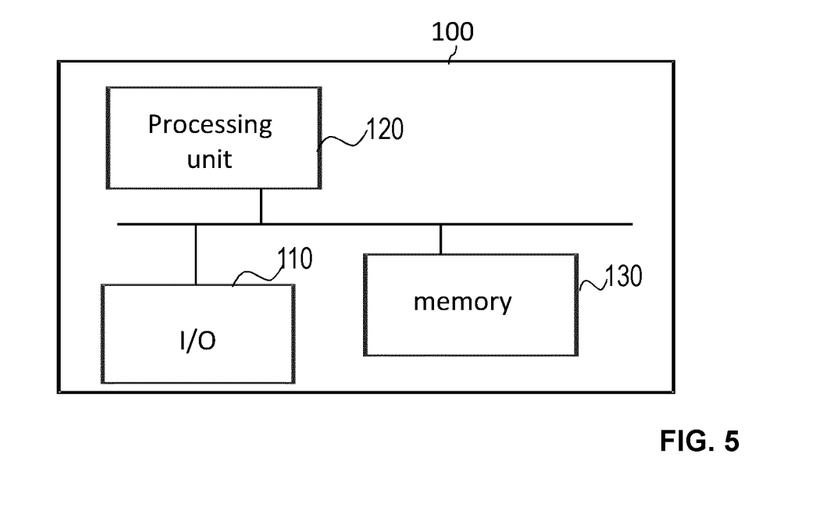
FIG. 5 shows a schematic view of an entity configured to determine that resource needs for the network function in the telecommunications network.

FIG. 5 shows a schematic architectural view of an entity 100 which can carry out the above discussed determination of the resource needs. The entity 100 comprises an interface 110 which is provided for transmitting user data or control messages to other entities and for receiving user data and control messages from other entities. The interface is especially qualified to receive training data and to output the resource needs. The entity furthermore comprises a processing unit 120 which is responsible for the operation of the entity 100. The processing unit 120 comprises one or more processors and can carry out instructions stored on a memory 130, wherein the memory may include a read-only memory, a random access memory, a mass storage, a hard disk or the like. The memory can furthermore include suitable program code to be executed by the processing unit 120 so as to implement the above described functionalities in which the entity is involved.

Figure 6:
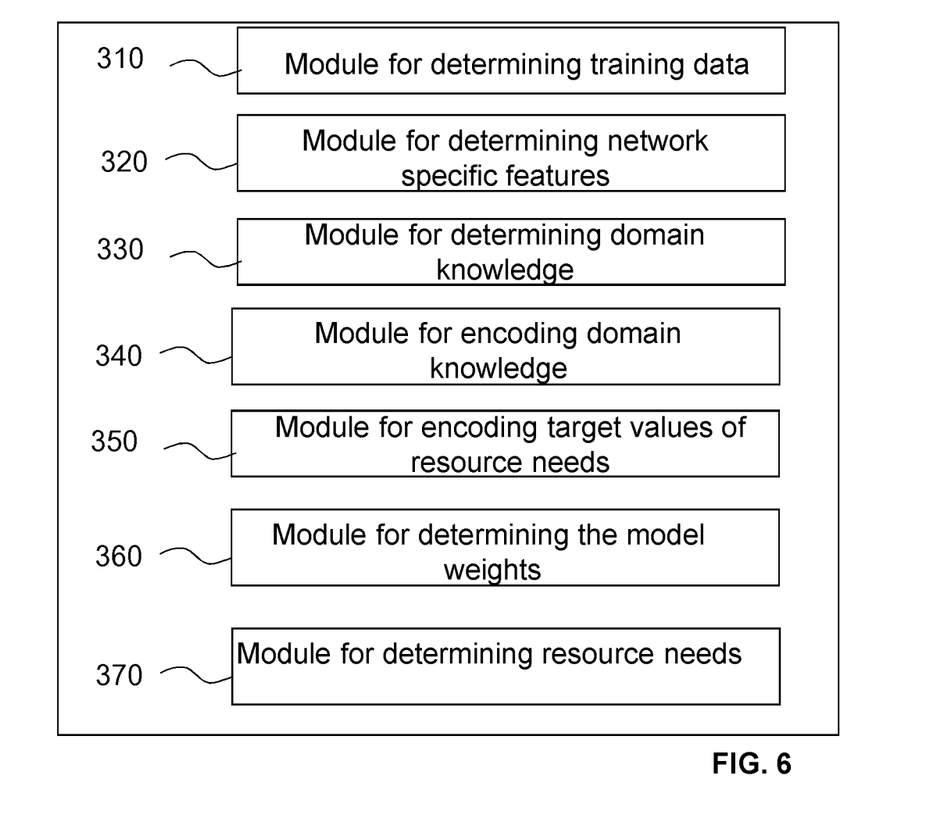
FIG. 6 shows another schematic view of the entity configured to determine that resource needs for the network function in the telecommunications network.

FIG. 6 shows another schematic architectural view of an entity 300 which can carry out the above discussed determination of the resource needs. The entity 300 compressed a first module 310 configured to determine the training data, module 320 is configured to determine the domain specific features of the communications network to be used as predictors of the regression model. A module 330 is provided configured to determine the domain knowledge of the telecommunications network and module 340 is configured to encode the domain knowledge as at least one of a prior probability distribution and constraints between the model weights and boundaries of the model weights. Module 350 is configured to encode target values of the resource needs as a likelihood probability distribution centered on outcomes of the regression model. Module 360 is configured to determine the model weights through the Bayesian modeling and module 370 is provided configured to determine the resource needs based on the determined regression model.

From the above said some general conclusions can be drawn:

The step of determining the model weights can comprise the step of maximizing a posterior probability distribution of the model weights taking into account the likelihood probability distribution, the prior probability distribution and optionally at least one of the constraints between the model weights and boundaries of the model weights.

Furthermore, the encoding of the domain knowledge can comprise the step of using at least one of the constraints between the model weights and boundaries of the model weights to reduce a search space in an optimization method used to solve the Bayesian regression.

The model weights may be determined as maximum-a-posteriorly weights determined by maximizing a posterior probability distribution of the model weights given the prior probability distribution, the likelihood probability distribution.

Furthermore, it is possible to determine a comparative regression model without domain knowledge using the training data. Furthermore, the resource needs are determined based on the determined comparative regression model and the resource needs determined with the comparative regression model is compared to the resource needs determined with the regression model determined by the incorporated domain knowledge. The selection of the regression model may be confirmed based on the comparing and a predefined threshold. Furthermore, the selected regression model may be returned as a dimensioning model to be used by the entity 100 as dimensioning system which is configured to determine the resource needs.

The model weights may be determined as having a Gaussian distributions centered around an expected value as determined based on the domain knowledge.

The Bayesian regression may be a Bayesian Linear Regression model. By virtue of using Bayesian modeling to incorporate domain knowledge, a Bayesian Linear Regression model was developed.

The regression model could be any regression model that is a function of feature predictors and weights, which are to be determined. For example polynomial regression or neural network model. We develop Bayesian equivalents of these regression models through this invention.

When the resource needs are determined, it is possible that a processor load of at least one processor used to provide the network function is determined. Furthermore, a number of processors used to provide the network function may be determined or a number of units of a virtual network function configured to provide the network function. Furthermore, utilization of memory needed to provide the network function may be determined as resource needs.

The domain specific feature can include features such as a number of call attempts, a number of answered calls, a total duration of a call, a number of registration attempts received by the network function, a number of re-registration attempts received by network function or a number of de-registration attempts.

The domain specific features may be determined from counters measuring performance of the telecommunications network.

The domain knowledge can comprise knowledge such as the fact that a number of call attempts and a number answered calls are the model weights of the regression model having the highest values among the model weights. Furthermore, a model weight for a number of call attempts may be larger than a model weight for a number of answered calls. The domain knowledge can include the fact that all model weights used in the regression model have positive values. Furthermore, the model weights for the number of registration attempts and the model weights for the number of de-registration attempts may have similar values. The domain knowledge can furthermore include a set of possible values for the model weights, a lower or upper boundary for the model weights, and a standard deviation or variance for the probability distribution used for each of the model weights. The network function can comprise functions such as the core session control function, CSCF, a gateway in EPC network, a Multimedia Telephony application Server or a secure border gateway, SBG (Secure Border Gateway).

The invention results in a model that is specific for the Network Functions in the Field of telecommunications networks. The domain knowledge injection is done by biasing the modeling process and using additional degrees of freedom afforded by an optimizer. Biasing (through the prior) has the effect of modifying the cost function to be optimized based on the domain knowledge. Explainability of a model can be addressed after a model is constructed (down-stream process) or can be embedded into the modeling process itself (upstream process) to arrive at a more explainable model to begin with. The invention discussed above uses the second approach. Embedding explainability or interpretability into the modeling process can be done in different ways,
  use telecommunications domain specific features,
  use telecommunications knowledge in the model selection
  use telecommunications knowledge to bias and thereby obtain intuitive model parameters. All three are done, but the focus of the invention discussed above in on the last aspect mentioned above.

The entity or system proposed enables the user to provide domain inputs specific for individual NF. I.e. different set of domain inputs for IMS NFs such as CSCF, MTAS separately there by creating model that is specific and relevant for each NFs The approach compares the model weights and performance metrics with & without Domain knowledge insertion to select and deploy the appropriate model The proposed results in increased trust, intuitive interpretations and a white-box perception of the model.

The invention claimed is:

1. A method for determining resource needs needed in a telecommunications network for providing a network function in the telecommunications network, the method comprising:
   determining training data describing a network traffic,
   determining domain specific features of the telecommunications network to be used as predictors of a regression model in which the predictors are weighted by model weights to determine the resource needs, wherein the training data are described by the regression model, the regression model being configured to predict the resource needs,
   determining domain knowledge of the telecommunications network on at least one of expected values of the model weights, expected boundaries of the model weights and constraints between the model weights,
   encoding the domain knowledge as at least one of a prior probability distribution, constraints between the model weights and boundaries of the model weights,
   encoding target values of the resource needs as a likelihood probability distribution centered on outcomes of the regression model,
   determining the model weights, for use with the regression model, through Bayesian modeling, taking into account the likelihood probability distribution and the prior probability distribution, and
   determining the resource needs based on the regression model.

2. The method of claim 1, wherein determining the model weights comprises maximizing a posterior probability distribution of the model weights taking into account the likelihood probability distribution and the prior probability distribution.

3. The method of claim 1, wherein encoding the domain knowledge comprises using the at least one of the constraints between the model weights and the boundaries of the model weights to reduce a search space in an optimization method used to solve a Bayesian regression of the Bayesian modelling.

4. The method of claim 1, wherein the model weights are determined as Maximum-a-Posteriori weights determined by maximizing an a posterior probability distribution of the model weights given the prior probability distribution, the likelihood probability distribution and the expected boundaries.

5. The method of claim 1, further comprising:
   determining a comparative regression model without the domain knowledge using the training data,
   determining the resource needs based on the determined comparative regression model,
   comparing the resource needs determined with the comparative regression model and the resource needs determined by the regression model determined by the domain knowledge,
   confirming selection of the regression model based on the comparing and a predefined threshold, and
   returning the selected regression model as a Dimensioning model to be used by a Dimensioning system.

6. The method of claim 1, wherein the model weights are determined as having a Gaussian distribution centered around an expected value as determined based on the domain knowledge.

7. The method of claim 1, wherein the Bayesian modeling comprises a Bayesian Linear regression.

8. The method of claim 1, wherein determining the resource needs comprises determining:
   a processor load of at least one processor used for providing the network function,
   a number of processors used to provide the network function,
   a number of units of a virtual network function configured to provide the network function, and/or
   a utilization of memory needed to provide the network function.

9. The method of claim 1, wherein the domain specific features comprise:
   a number of call attempts,
   a number of answered calls,
   a total duration of a call,
   a number of registration attempts received by the network function,
   a number of re-registration attempts received by the network function, and/or
   a number of de-registration attempts.

10. The method of claim 9, wherein the domain specific features are determined from counters.

11. The method of claim 1, wherein the domain knowledge comprises:
    a number of call attempts and a number of answered calls are the model weights of the regression model having the highest values among all model weights,
    a model weight for a number of call attempts is larger than a model weight for the number of answered calls,
    all of the model weights used in the regression model having positive values:
       a set of possible values for the model weights,
       an upper or lower boundary for the model weights, and/or
       a standard deviation or variance for the prior probability distribution used for each of the model weights.

12. The method of claim 1, wherein the network function comprises:
    a call session control function,
    a gateway in an EPC network,
    a Multimedia Telephony application Server, and/or
    a Secure Border Gateway.

13. An apparatus configured to determine resource needs needed in a telecommunications network for providing a network function in the telecommunications network, the apparatus comprising:
    memory; and
    processing circuitry, wherein the apparatus is configured to:
    determine training data describing a network traffic,
    determine domain specific features of the telecommunications network to be used as predictors of a regression model in which the predictors are weighted by model weights to determine the resource needs, wherein the training data are described by the regression model, the regression model being configured to predict the resource needs,
    determine domain knowledge of the telecommunications network on at least one of expected values of the model weights, expected boundaries of the model weights and expected inter-relationships between the model weights,
    encode the domain knowledge as at least one of a prior probability distribution, constraints between the model weights and boundaries of the model weights,
    encode target values of the resource needs as a likelihood probability distribution centered on outcomes of the regression model, determine the model weights, for use with the regression model, through Bayesian modeling, taking into account the likelihood probability distribution and the prior probability distribution, and determine the resource needs based on the regression model.

14. The apparatus of claim 13, further being configured, for determining the model weights, to maximize a posterior probability distribution of the model weights taking into account the likelihood probability distribution and the prior probability distribution.

15. The apparatus of claim 13, further being configured, for encoding the domain knowledge as expected boundaries, to using the at least one of the constraints between the model weights and the boundaries of the model weights to reduce a search space in an optimization method used to solve a Bayesian regression of the Bayesian modelling.

16. The apparatus of claim 13, further being configured to determine the model weights as Maximum-a-Posteriori weights determined by maximizing an a posterior probability distribution of the model weights given the prior probability distribution, the likelihood probability distribution and the expected boundaries.

17. The apparatus of claim 13, further being configured to:
determine a comparative regression model without the domain knowledge using the training data,
determine the resource needs based on the determined comparative regression model,
compare the resource needs determined with the comparative regression model and the resource needs determined by the regression model determined by the domain knowledge,
confirm selection of the regression model based on the comparing and a predefined threshold, and
return the selected regression model as a Dimensioning model to be used by a Dimensioning system.

18. The apparatus of claim 13, further being configured to determine the model weights as having a Gaussian distribution centered around an expected value as determined based on the domain knowledge.

19. The apparatus of claim 13, further being configured, for determining the resource needs to determine at least one of:
a processor load of at least one processor used for providing the network function,
a number of processors used to provide the network function,
a number of units of a virtual network function configured to provide the network function,
a utilization of memory needed to provide the network function.

20. A non-transitory computer readable storing medium storing a computer program comprising program code to be executed by a processing unit of an entity, wherein execution of the program code causes the entity to perform the method of claim 1.

* * * * *